United States Patent [19]
Harvey

[11] 3,956,131
[45] May 11, 1976

[54] SYSTEM FOR SEPARATION OF LIQUIDS AND SOLIDS FROM A CARRIER LIQUID

[75] Inventor: Andrew C. Harvey, Waltham, Mass.

[73] Assignee: Foster-Miller Associates, Inc., Waltham, Mass.

[22] Filed: Mar. 6, 1974

[21] Appl. No.: 448,536

[52] U.S. Cl. .............................. 210/202; 210/259; 210/297; 210/369; 210/381
[51] Int. Cl.² ................................... B01D 33/00
[58] Field of Search ............. 210/73, 81, 84, 23, 210/297, 369, 381, 71, 221, 216, 211, 259, 202

[56] References Cited
UNITED STATES PATENTS
1,842,464  1/1932  Termeer ........................... 210/297
3,092,582  6/1963  Lacker ............................. 210/297 X FOREIGN PATENTS OR APPLICATIONS
1,032,179  6/1958  Germany ........................... 210/369

Primary Examiner—Frank A. Spear, Jr.

[57] ABSTRACT

An integrated system for the separation of liquid and solids entrained in a carrier effluent including a primary gross oil and solids separator, a secondary solids separator and a three stage centrifuge for final separation of fine solids and said entrained liquid from the carrier effluent.

10 Claims, 10 Drawing Figures

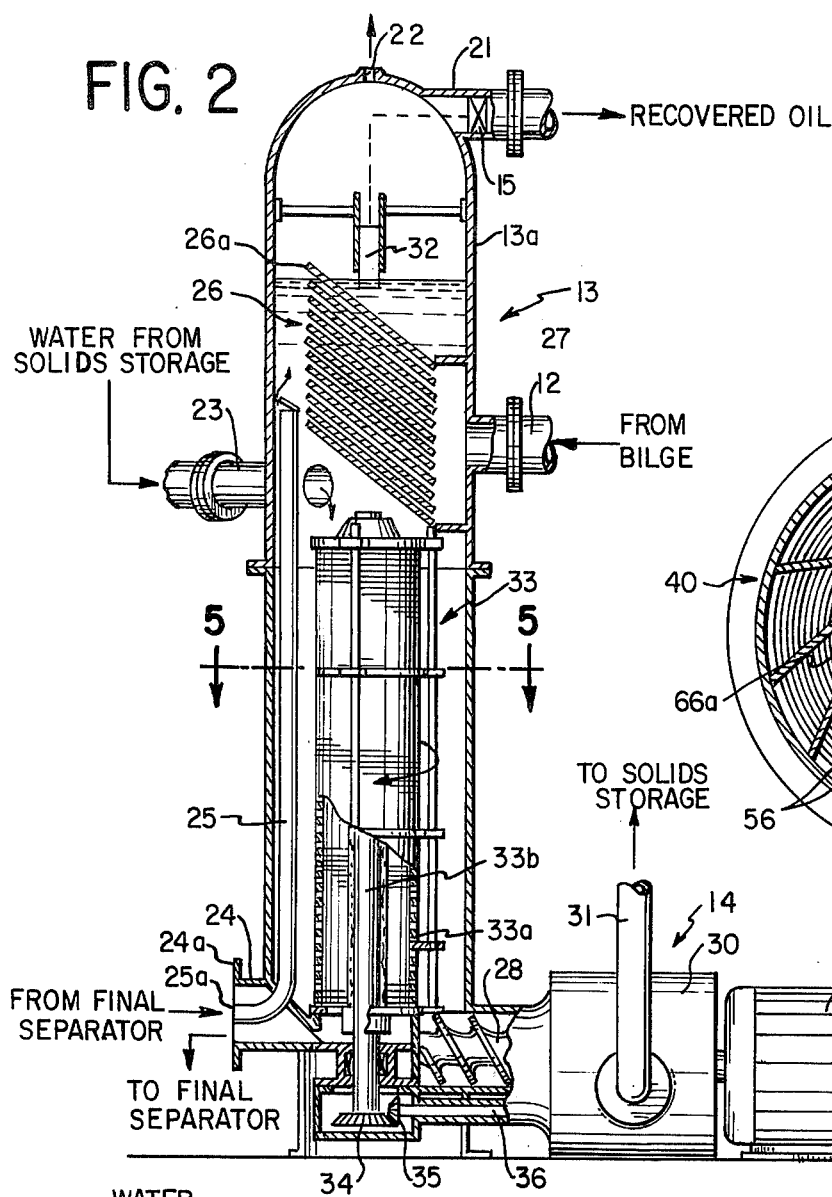
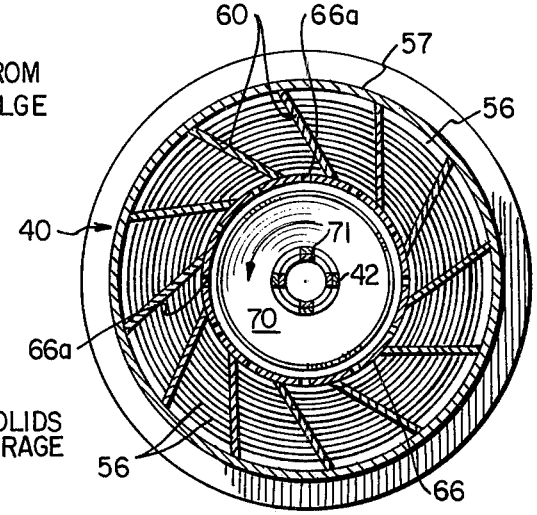
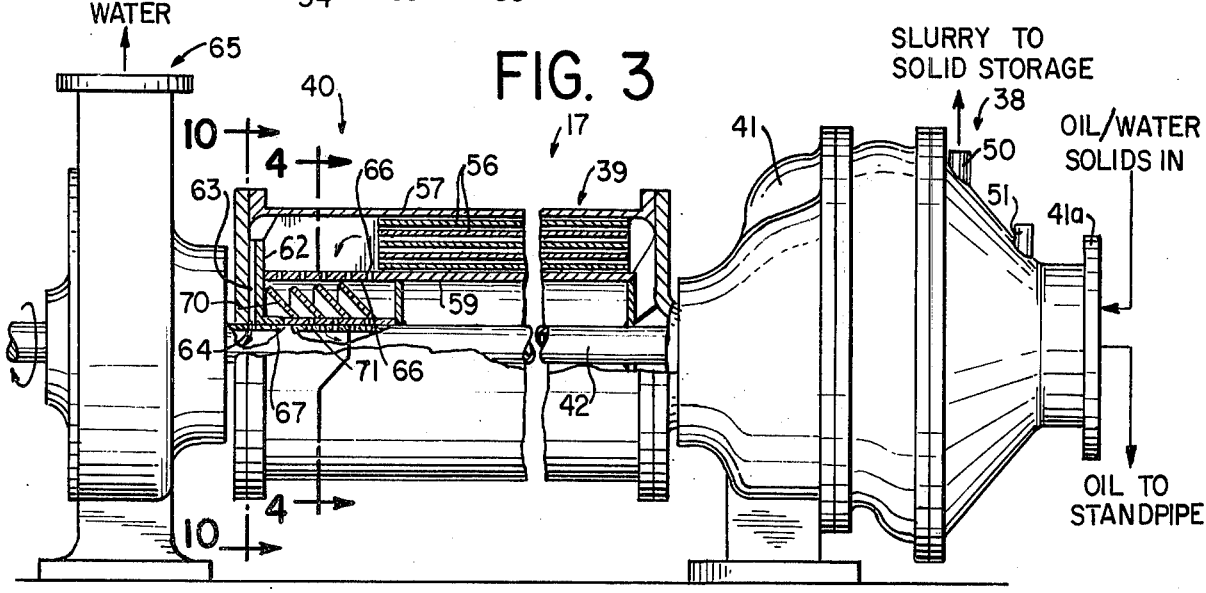

SYSTEM FOR SEPARATION OF LIQUIDS AND SOLIDS FROM A CARRIER LIQUID

BACKGROUND OF THE INVENTION

The present invention concerns a unique system for separating a dispersed liquid of lower specific gravity, such as oil, from a carrier liquid having a higher specific gravity, such as water, in which it is entrained, while simultaneously separating from the carrier liquid coarse to fine solids dispersed throughout the liquid. The system of the present invention was devised to solve longstanding water pollution problems caused by discharging into harbors or upon the high seas, contaminated water used to flush ships' bilges, bunker fuel tanks and oil cargo tanks. International regulations in effect prohibit the discharge of such waste water containing more than 100 parts per million of oil contaminant. The present invention has been successfully and continuously demonstrated with discharge levels of contaminant no greater than 10 parts per million.

The system of the invention has been designed to provide the following advantages:

a. Minimum system size;

b. The ability to overcome with high-g and shear forces, the surface and ionic forces in oil-surfactant mixtures, leading to improved separation efficiency;

c. Insensitivity of the final separation to ship motion, because of the high-g separation forces used;

d. Insensitivity to large fluctuations in effluent quality;

e. No requirement for replaceable or regenerable media or items;

f. Insensitivity to air entrainment in the final separation;

g. Opportunity for automatic system backflushing without skilled operators and without the danger of system damage.

Accordingly, the inventive system not only solves quite uniquely the problem of reducing contamination in discharge flow to the aforementioned level but uniquely provides a system design which is most compact in size and which uniquely integrates the functions of related portions of the system. The overall system consists of three basic levels of separation. The first or primary separator is designed to maintain an oil/water interface and to reduce any high free oil loading in the effluent to a dispersed lower concentration prior to its entry into subsequent levels of separation. The second separation unit continuously removes solids that would otherwise hinder the collection of fine oil particles by causing premature clogging of the final separator. The centrifugal separator first separates find solids and larger oil particles and then coalesces and separates the remaining oil to further reduce the oil concentration in the effluent to below the specified 10ppm.

SUMMARY OF THE INVENTION

In accordance with the present invention there has been devised a uniquely integrated system for the separation of dispersed liquid such as oil and solids from a carrier liquid such as water. Gross solids and liquid separation is first accomplished compactly within a vertical cylinder or standpipe. Arranged along the vertical axis of the standpipe is a multiplate diffuser through which the contaminated effluent is initially directed and immediately beneath the diffuser, a coarse solids filter. While some separation of oil from the carrier liquid occurs in the multiplate diffuser, its function and the function of the filter is primarily to separate gross solids, which are removed to a solids storage tank. Oil which has been separated rises into a collection chamber at the top of the standpipe and means are provided in conjunction with oil removal means for maintaining an oil/water interface slightly above the inlet to the standpipe. The remaining effluent is directed into a centrifugal separator comprising three stages.

The first stage of the centrifugal separator will separate practically all remaining finely dispersed solids from the carrier liquid and will separate all but very finely dispersed lighter liquid, such as oil, therefrom. The means by which this is accomplished comprises a conical shrouded rotor mounted in a stationary housing or casing, the rotor containing between inner and outer sections thereof a plurality of axial vanes extending from a small diameter near the rotor inlet to a larger diameter axially removed from said inlet. The vanes are slanted from a truely radial direction at an angle toward the direction of rotation of the rotor intermediate radial and tangential directions, the slanting of the vanes providing surfaces for rapid sedimentation of oil and solids under the action of centrifugal forces. The vanes also direct and exert a pumping and swirling action upon the liquid flow. Curved pump-like inlet vanes direct flow into the rotor. Oil removed from the effluent is displaced inwardly toward the center of rotation and is forced to flow into a conduit which conducts the oil to the collection chamber in the standpipe for removal therefrom. The outer section of the rotor contains openings for the passage of a slurry of solids and water forced therethrough by centrifugal action. The slurry is removed from the casing surrounding the rotor at a position of maximum concentration of solids and is conducted to a hydro-cyclone for further separation of water from the slurry before the solids are deposited in the solids storage tank.

After passing through the first stage of the centrifuge, the remaining finely dispersed oil and water is pumped through a series of closely spaced concentric cylindrical or spirally wrapped sheets coaxially arranged so as to force the flow to be divided into radially thin axial streams over an extended distance. During the flow through the aforementioned narrow passages, oil is displaced from the water and coalesced into streams or relatively large drops such that when the oil and water are discharged from the coalescer into the third stage, immediate separation of oil from the water is effected. The third stage comprises a series of axial, slanted vanes which cause the aforementioned separation. Another series of generally radial turbinelike vanes defining passages therebetween recover energy from the fluid flow as the effluent leaves the third stage thus reducing the power needed to drive the separator. All oil flow is directed inwardly within the hollow shaft mounting the respective stages and is conducted with separated oil from the first stage to the collection chamber in the standpipe.

BRIEF DESCRIPTION OF THE DRAWING

FIG. 2 is a view primarily in cross section of the primary separator portions of the system shown in FIG. 1;

FIG. 3 is a view primarily in cross section of the final separator of the system of FIG. 1;

FIG. 4 is a view taken in the direction of Arrows 4—4 of FIG. 3;

DESCRIPTION OF A PREFERRED EMBODIMENT

Figure 1:
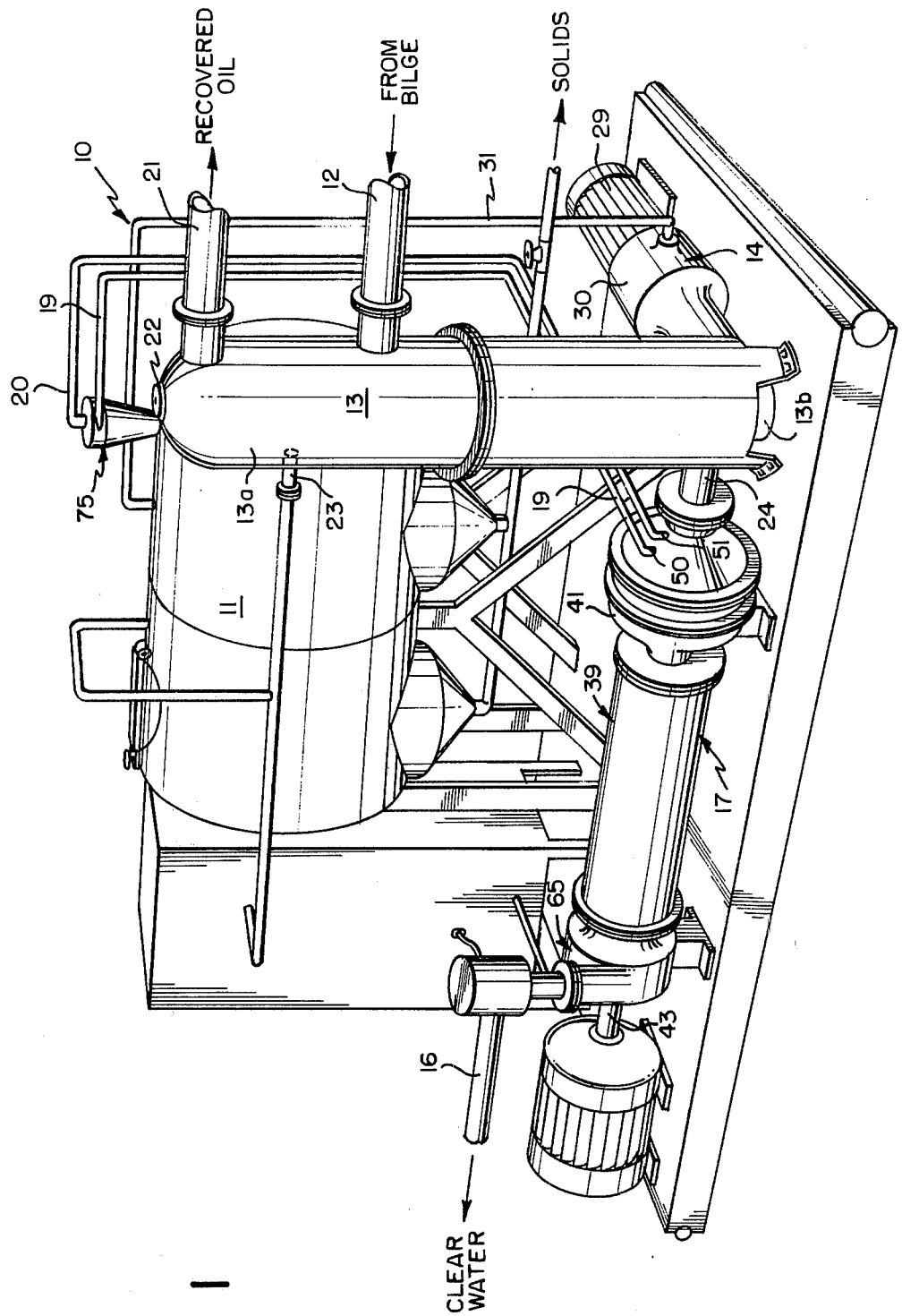
FIG. 1 is an overall view in perspective of the system of the present invention.

Referring now to the drawing and initially to FIG. 1 thereof, an integrated system 10 for the removal of solids and liquid entrained in a carrier effluent in accordance with the principles of the present invention has been illustrated. In the illustrated embodiment, the effluent is water from the bilge of a ship containing therein dispersed entrained coarse and fine solids and dispersed entrained oil. The effluent is initially conducted from the bilge to a conduit 12 where it enters the vertical standpipe 13, whose interior parts and function will be described in connection with FIG. 2. Large globules and slugs of oil will rise and be collected in the domed top of the standpipe 13 to be removed therefrom as recovered oil. Also, as will be described, a primary separation of solids from the bilge water takes place within standpipe 13, and these are removed by the solids pump 14 and are transmitted to the tank 11 through conduit 31. Flow containing fine solids and entrained liquid is directed into the horizontal, motor driven centrifugal separator 17 which has the capability to remove essentially all the remaining fine solids and to reduce the presence of dispersed oil in the final effluent therefrom to a concentration no greater than 10 parts per million. Oil removed by the separator 17 will flow axially through the separator into the standpipe 13 for collection and recovery from the domed top thereof, while separated fine solids are pumped through conduit 19 to the tank 11. Clear water is pumped overboard through pipe 16.

Operation of the system 10 will now be described more particularly with respect to its component parts beginning with the apparatus housed in the standpipe 13. Bilge flow containing entrained solids and oil enters at 12 slightly more than midway above the center of the standpipe 13. The latter includes an outer shell or casing 13a, having an outlet conduit 21 from the domed portion of the standpipe and a bleed 22 for the removal of air. The standpipe 13 further includes an inlet 23 which permits water from the tank 11 to be recirculated and further includes outlet 24 which is connected to the centrifugal separator 17.

Immediately adjacent to the inlet 12 is a diffuser 26 comprising a series of parallel plates 26a. The plates 26a are secured to the interior of casing 13a such that their lower edges are directed toward the inlet 12. A baffle 27 assures that all flow from the inlet will be directed into the plates 26. The plates 26a are closely spaced, are slanted upwardly and tilted laterally. The plates 26a divide the effluent into many layers, to reduce the settling (or rise) distance of the solid and oil particles in the bilge flow. Solids settle onto the top sides of the plates 26a and oil particles rise to the undersides of the plates. Since the entire plate system is tilted laterally as well as slanted upwardly, solids slide sideways and downwardly in relation to the water flow. Having been removed from the flow stream, the solids settle to the sump 13b at the bottom of the standpipe and are removed by a small screw 28 driven by the motor 29 through gear box 30. Solids removed by the screw 28 are pumped to the tank 11 through conduit 31.

Oil particles rising to the underside of plates 26a are removed from the flow stream and rise upwardly and laterally with respect to the straight-through water flow. Having been removed from the flow stream, these oil particles are free to rise into the domed area 13b for subsequent removal. Such removal is controlled by valve 15 located in conduit 21 under the control of a float 32 such that an oil/water interface will be maintained slightly above the inlet 12.

Figure 5:
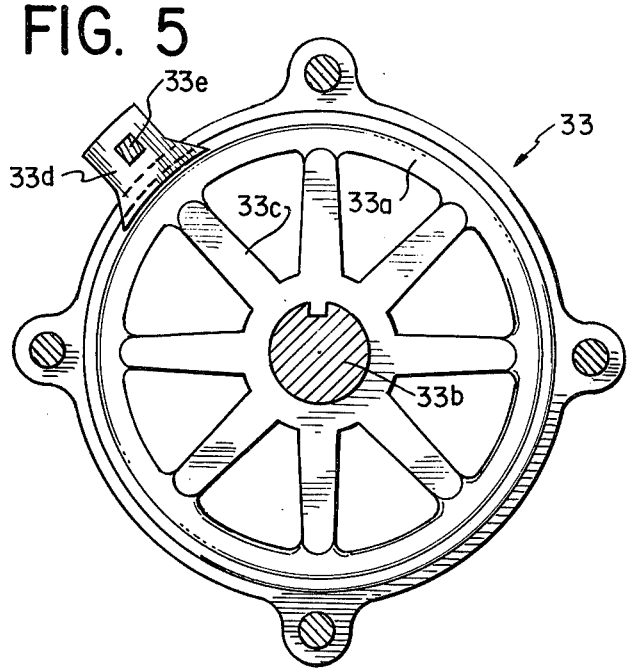
FIG. 5 is a view taken in the direction of Arrows 5—5 of FIG. 2.

After the separation of gross solids and larger particles of oil by diffuser 26, flow will continue downwardly around and through a solids filter 33. The filter in the present embodiment is of the edge disc type, although it will be apparent that other types of filters may be substituted. The edge disc filter 33 consists of a series of flat closely spaced wheel-like discs 33a mounted for rotation upon a central shaft 33b (See FIG. 5). The shaft 33b has a gear 34 mounted upon its lower end which meshes with gear 35 upon shaft 36 driven by the gear box 30. Spacers 33c lie between respective discs 33a, the thickness of these spacers controlling the degree of filtration. Stationary cleaning blades 33d are held adjacent to the outer circumference of the spacers 33c by a separate shaft 33e. Water containing oil and finely dispersed solids may penetrate the edge of the filter. Solids, say larger than 250 microns, are blocked by the filter, are "combed out" by the cleaning blades 33d and fall to the sump 13c for removal by the screw 28. Water with finely dispersed oil and solids leaves the interior of the filter 33 out of outlet 24 and into the first stage of the centrifugal separator 17.

Figure 7:
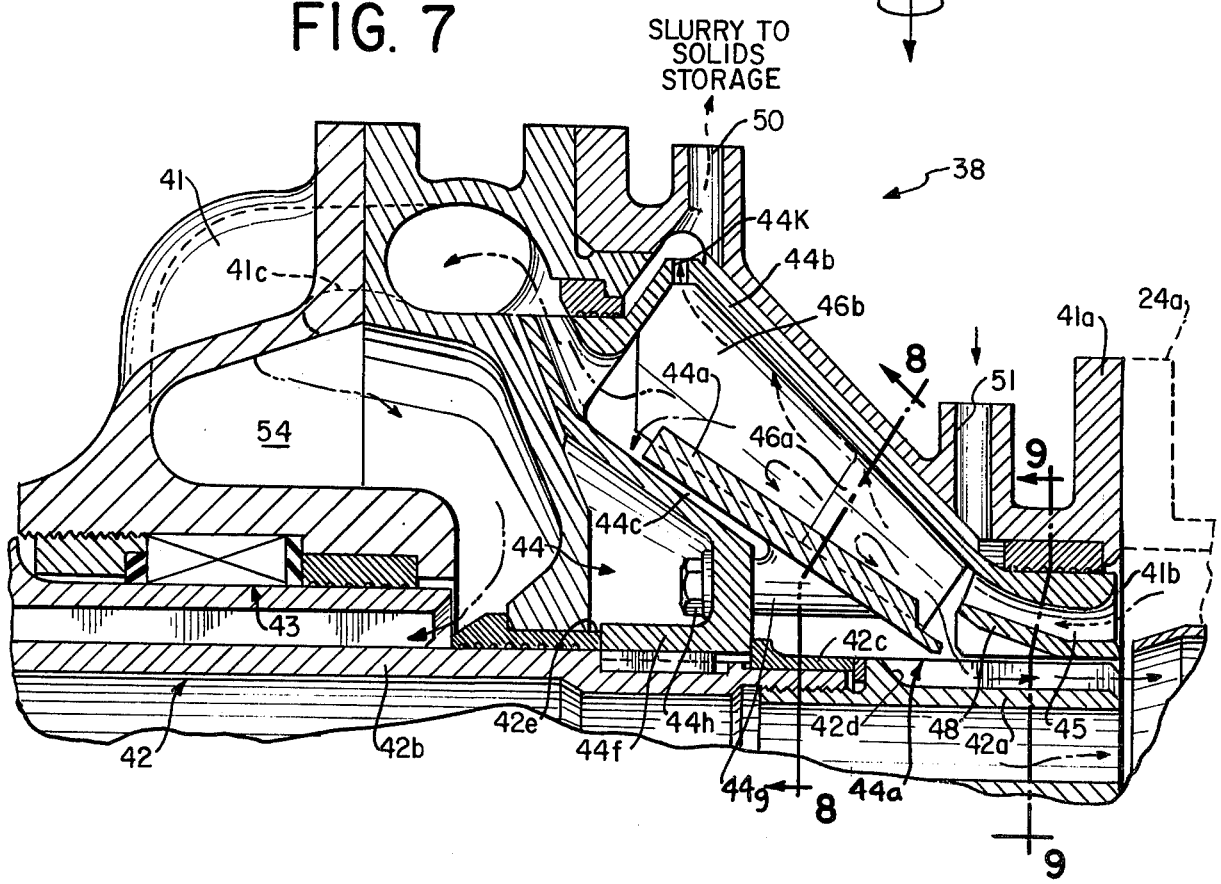
FIG. 7 is an enlarged view of the first stage of the centrifugal separator shown in FIG. 3.
Figure 8:
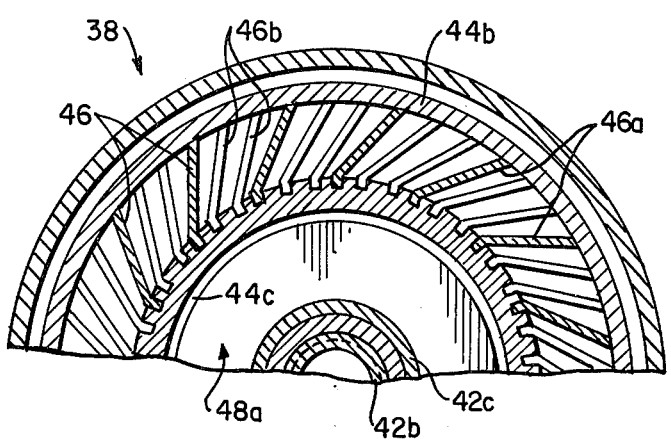
FIGS. 8 and 9 are sections respectively taken in the direction of Arrows 8—8 and 9—9 of FIG. 7.
Figure 9:
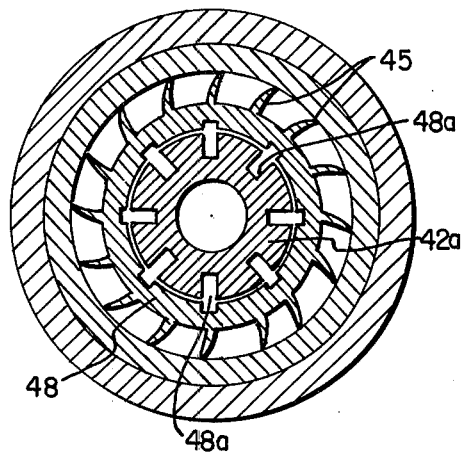
Figure 10:
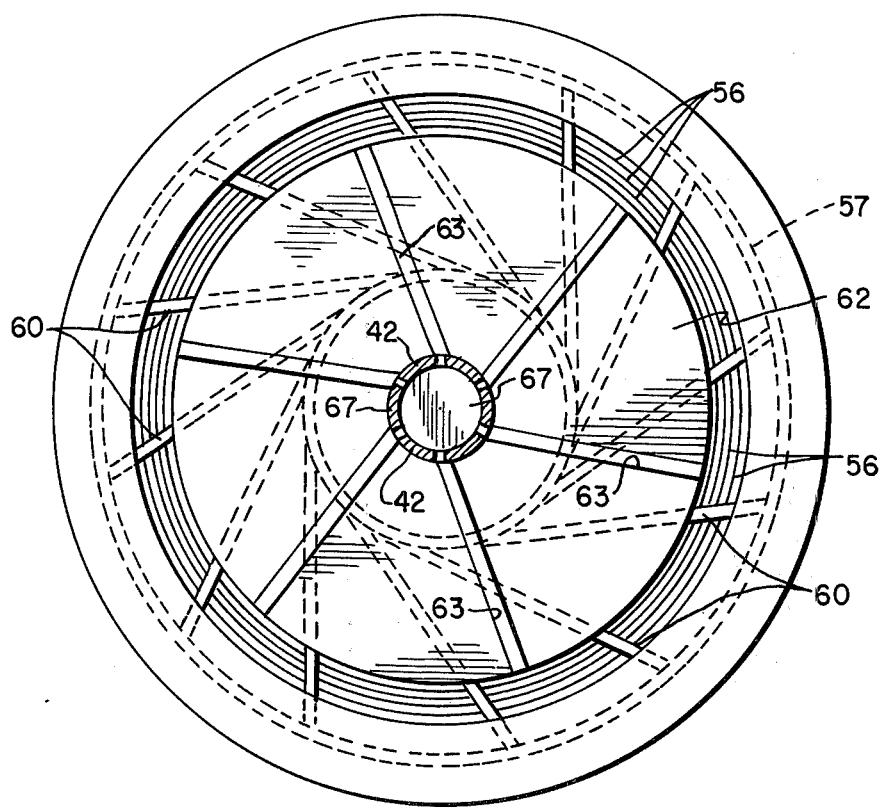
FIG. 10 is a section taken in the direction of Arrows 10—10 of FIG. 3.

As will be seen with respect to FIGS. 3 and 7, the centrifugal separator 17 consists of three stages which have been identified by reference numerals 38, 39 and 40. The first stage 38 (FIG. 7) includes a stationary outer casing 41 having a flange 41a defining an inlet opening 41b for connection with a flange 24a at the outlet 24 of the standpipe. A hollow shaft 42 extends throughout the casing 41 and throughout adjacent stages 39 and 40, the shaft being journalled for rotation at 43 and at its opposite end externally of the third stage 40, the details of which have been omitted for the sake of clarity. Shaft 42 includes sections 42a, 42b threaded together. A spacer 42c which bears against a projecting lip portion 42d of section 42a defines, together with a complementary portion 42e of section 42b, a series of grooves 42f. Grooves 42f are adapted to accommodate keying portions of a continuous circular flange 44f which forms part of a shrouded rotor 44, the flange 44f comprising a portion of an outer shell or wall of the shrouded rotor 44. A support flange 44g having tapped openings therein receives bolts 44h therein in order to secure an inner section 44a of the rotor to the flange 44f and thus to the outer shell of the rotor. The flange 44f is secured in the groove 42f of the shaft 42 by tightening sections 42a and 42b by means of the threaded interconnection as shown. In this manner, the spacer 42c is brought to bear against the base of flange 44f and against section 42e.

The rotor 44, generally of frusto-conical shape having a minimum diameter at its end closest to the inlet opening 41b and having a maximum diameter at its end farthest removed from this opening, is thus securely mounted upon the shaft 42 for rotation therewith. Rotor 44 includes inner section 44a and an outer section 44b. A plurality of parallel vanes 46a, 46b extend axially between the rotor sections 44a, 44b. The vanes are securely mounted in slots (not shown) in the inner section 44a of the rotor. In the illustrated embodiment, each of the vanes 46a, 46b are slanted toward the direction of rotation, which is clockwise Vanes 46a are those in a series closest to the inlet opening 41b, while vanes 46b are a second parallel series approximately twice the number of vanes 46a due to the increased diameter of the rotor. Each series of vanes extends in a truely axial direction, outwardly at the aforementioned slant angle between sections 44a and 44b. In the present embodiment, the slant angle between the vanes and the rotor axis is approximately 45°, although such angle is not critical to the invention. The purpose of this slant orientation of vanes 46a, 46b is to cause the vanes to provide a narrow radial space for rapid sedimentation of oil and solids.

It will be seen that immediately adjacent to the inlet opening 41b, flow from the standpipe 13 is directed into the series of vanes 46a and 46b by plurality of vanes 45 which are themselves curved in the direction of rotation in the manner of inlet vanes to a pump for example. Vanes 45 thus initiate flow in a clockwise direction prior to vanes 46a, 46b. Vanes 45 are mounted to a ring 48 which defines an annular passage 48a between ring 48 and rotor shaft 42. Oil separated from the effluent by rotation of rotor 44 will be displaced inwardly and will flow along section 44a into passage 48a. A series of passages 44c in rotor section 44 conducts oil displaced beyond blades 46a inwardly and into passage 48a. Referring to FIG. 2, it will be seen that the end 25a of a tube 25 is coaxial with the end of shaft 42 and due to the aforementioned displacement action, oil flowing into passage 48a will flow in a reverse direction to that of effluent flow into tube 25 and rise therein to the collection dome 13b.

Figure 6:
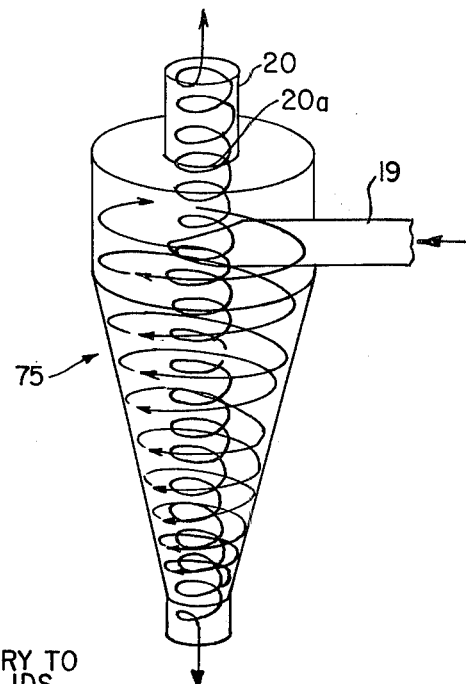
FIG. 6 is a schematic detail of a hydro-cyclone forming a part of the system of FIG. 1.

Casing 41 is provided with a solids outlet opening 50 at a position outwardly adjacent to the vanes 46a at the maximum diameter of rotor section 44b. At this position, section 44b defines a series of radial slots 44k. Fine solids, because of their greater-than-water-or-oil density, will be thrown outwardly toward casing 41 to migrate through slots 44k as a slurry to pass through outlet 50 into conduit 19 to a hydro-cyclone 75, thence into tank 11. With reference to FIG. 6, it will be seen that the hydro-cyclone 75 receives pressurized slurry tangentially from conduit 19. Slurry rotation develops high centrifugal forces throughout the cyclone, the liquid moving inward and upward as a spiralling vortex and is removed from outlet 20a through conduit 20 to be returned through inlet 51 to the separator 17. Suspended solids are driven toward the wall of the hydro-cyclone and downward into tank 11. Liquid passing through inlet 51 flows about the section 44b of the rotor toward outlet 50 to flush the slurry from the casing.

Referring to FIG. 3, after removal of some lighter phase liquid and substantially all fine solids, the effluent continues radially outwardly through passage 53 toward casing 41, defined in part by section 41c of said casing, and then radially inwardly into the pressure chamber 54 leading to axial passage 55 prior to entering the second stage 39 whose construction and function will now be described.

The second stage 39 of the centrifuge 17 shall sometimes be referred to as a coalescer, wherein fine streams of water primarily containing finely dispersed particles of oil are forced to travel axially throughout an extended length and for sufficient time so that under the high gravitational force induced by rotation, all but a minute quantity of the oil will be separated from the water flow. The structure by which this is accomplished comprises a series of closely spaced concentric sheet metal plates 56 in the form of cylinders concentrically nested within each other, or a continuously wrapped spiral sheet with suitably arranged spacing, layer-to-layer. The plates 56 are enclosed within an outer casing 57 and receive the flow from first stage 38, the flow being directed axially from passage 55 into the spaced edges of plates 56. The series of plates 56 are secured on a hollow rotor 59 welded to shaft 42 for rotation therewith, the plates being held apart by spaces (not shown) to provide an essentially rigid structure capable of withstanding relatively high centrifugal forces. During rotation, water with finely dispersed oil is forced axially through the narrow passages between each of the respective plates 56. During the axial travel of the effluent, water will tend to gravitate outwardly along the underside of each of the concentric layers while oil will tend to be displaced inwardly against the adjacent plate's surfaces and will tend to coalesce thereon in fine streams or droplets. The respective water and oil streams proceed axially to emerge into the third stage 40.

Stage 40 consists of a series of axial vanes 60 slanted in the same manner as vanes 46a, 46b whose function is to receive the respective water and oil streams from the coalescer just described. When these impinge upon the vanes 60, water (due to its greater density) will be thrown outwardly against the casing 57 to proceed over the weir 62 through passages 63 toward the center of shaft 42 at 64 to be discharged from outlet 65. Passages 63 may be radial or placed at angles with respect to radii of the center of shaft 42 in order to recover energy from the effluent to operate in effect as inward-flow turbine blades to drive the separator 17. Oil particles from the coalescer stage 39 are displaced inwardly along vanes 60 through slots 66a in a cylindrical wall 66. Between the wall 66 and shaft 42 are disposed a plurality of members 70 having a frusto-conical shape, said members being concentric with the axis of shaft 42. A plurality of openings 71 permit oil displaced inwardly from slots 66a and along members 70 to pass into the center of shaft 42. Shaft 42 is blocked at 67 to prevent intermingling of the oil flow and the water flow to outlet 65. Oil flow will proceed to the right as shown in FIG. 3 to join the flow from the first stage 38 and is taken up tube 25 to the collection dome 13b.

The operation of the integrated system may be summarized as follows:

Since the system chosen to be illustrated in this particular embodiment is designed for shipboard use, water (for example bilge water) with entrained solids and lighter phase liquid, such as oil, will be conducted periodically to the system 10 for separation of the water from the solids and oil dispersed therein. However, it should be stated that the present system is readily adapted to be used on ships such as tankers for example, for removing oil from ballast water in the ship's cargo after a ballast run. The system is also readily adaptable to land based operations.

In the present embodiment, water from bilge enters standpipe 13 at 12 immediately adjacent to the multiplate diffuser 26. The latter causes the inlet flow to be broken up into fine sheets to effect gross separation of larger oil particles and solids. Oil separated from the bilge flow will float upwardly into the collection dome 13b, and the agglomeration of oil therein will cause an oil/water interface to be formed which is regulated to be slightly above the inlet 12 by the interface float 32, which mechanically opens and closes a valve 15 in the outlet conduit 21. Solids slip downwardly and laterally from diffuser plates 26 to settle to the bottom, sump 13c of standpipe 13. These are removed by the solids pump comprising a screw 28 driven by motor 29 through intermediate gear box 30 for removal of solids to the storage tank 11. Additional solids are removed by an edge disc filter through which the effluent passes after leaving the diffuser 26. The filter 33 is selfcleaning due to the scraping action of discs 33a which slowly rotate against stationary scraper discs 33d. The solids removed by the filter 33 are also removed by the solids pump 14.

Flow from the interior of filter 33 proceeds through outlet openings 24 into the first stage 38 of the centrifugal separator 17. The flow is directed within the first stage 38 into a hollow or shrouded generally conical rotor 44 along and between a series of axial vanes which are swept at an angle intermediate to radial and tangential directions in the direction of rotation. The vanes also provide a pumping action. Due to gravitational or centrifugal separation principles, oil will tend to be separated in stage 38 to flow inwardly toward rotor shaft 42. The oil is acted upon by the vanes of the rotor causing reverse flow and will enter the tube 25a to rise to the collection dome 13b. Solids separated in stage 38 are thrown outwardly along the interior surface of section 44b. These migrate through slots 44k and are pumped through outlet 50 to hydro-cyclone 74 which causes further separation of water from solids and therefrom into tank 11.

After passing through the first stage 38, very nearly all but the most minute solids have been removed. The effluent containing finely dispersed oil particles next passes through and into the second stage of the separator, termed the coalescer. This stage consists of a series of closely spaced generally cylindrical coaxial sheets wherein the effluent is separated into very thin axial streams. Oil will be displaced by water in these streams and caused to coalesce along the outer surfaces of the sheets as thin streams or larger droplets. Any residue of solids will remain in the coalescer and can be flushed periodically therefrom when the system is not in operation. Water and oil proceed respectively into the third stage 40 where the streams and droplets of oil will flow along vanes 60 inwardly into shaft 42 to be conducted to the oil collection dome 13b. Water will flow from the third stage radially outwardly and after passing over weir 62, flows through turbine oriented passages 63 into the shaft 42 to be discharged from outlet 65 as substantially clear water.

It will be understood that the foregoing description has been of a particular embodiment of the invention and is therefore representative. In order to appreciate fully the scope of the invention, reference should be made to the appended claims.

I claim:
1. Apparatus for separating a lighter phase liquid and heavier solids from a carrier liquid effluent in which both said lighter phase liquid and solids are finely dispersed, comprising a hollow casing, a shaft rotatable about an axis in said casing, a shrouded rotor mounted upon said shaft having inner and outer sections, said rotor having a reduced diameter at a liquid inlet end thereof increasing in an axial and flow direction to a maximum diameter near the other end thereof, a plurality of generally parallel vanes mounted between said rotor sections for rotation therewith, said vanes extending axially between said rotor sections between said minimum and said maximum diameters, inlet means in said casing adjacent to the minimum diameter of said rotor for receiving said effluent, said outer rotor section defining a plurality of openings adjacent to said maximum diameter, an annular space surrounding said rotor defined between the casing and the outer section of said rotor, liquid inlet means to said annular space near said reduced diameter of the rotor, means for circulating liquid through said annular space, solids outlet means in said casing adjacent to said rotor openings, conduit means near the center of said rotor for permitting separated lighter phase liquid to be removed from said casing and passage means for the effluent to flow from said rotor into said casing and outlet means from said casing for removal of liquid and solids therefrom.

2. The apparatus of claim 1 wherein means are provided for the effluent to flow from said rotor at radii generally greater than the inlet means and employing rotor vanes which cause the effluent leaving the rotor to have substantial swirl relative to the casing.

3. The apparatus of claim 1 wherein said vanes extend at a slant angle intermediate to the radial and tangential directions.

4. The apparatus of claim 3 wherein a first set of vanes is arranged extending between sections from a position near said inlet to approximately midway of said rotor, a second set of vanes approximately twice the number of said first set extends from a position approximately midway of said rotor to the large diameter thereof, and said first and second sets are slanted and approximately 45° with respect to radial and tangential directions.

5. The apparatus of claim 3 wherein a pressure chamber is located adjacent to and downstream of said rotor, a cylindrical coalescer coaxially mounted for rotation upon said shaft, said coalescer comprising a plurality of thin sheets closely spaced apart in radiaL direction forming long thin axial passages open at each end to effect the coalessence of said lighter phase liquid on inner surfaces of each passage during flow of effluent from said pressure chamber through said coalescer to an outlet end thereof, a plurality of axial vanes connected by root portions to said shaft for rotation in said casing adjacent to said coalescer outlet, said vanes being slanted intermediate radial and tangential directions, a series of openings adjacent to the root portions of said vanes and means leading into said shaft, passage means in said shaft to conduct lighter phase liquid displaced inwardly to be discharged therefrom, a plurality of turbine-like vanes connected to said shaft downstream of said slanted vanes drawing energy from said effluent flow to drive said shaft and outlet means from said casing for discharging the remainder of the effluent therefrom after passing by said turbine vanes.

6. The apparatus according to claim 5 wherein the means leading into said shaft includes a plurality of frusto-conical members having a frusto-conical shape, said members being concentric with the axis of said rotor shaft, a cylindrical wall concentric with said shaft intermediate said vanes and said frusto-conical members, a plurality of openings in said wall whereby displaced lighter phase liquid may flow from said vanes onto said members and a second series of openings adjacent to said members leading into said shaft.

7. The apparatus of claim 3 wherein a series of curved inlet vanes are located near said rotor inlet, said inlet vanes being mounted upon a ring fixed to said rotor, said ring and shaft defining an annular passage for the passage of said lower specific gravity liquid upon rotation of the rotor and displacement of said liquid toward the center of said rotor and in a direction opposite to effluent flow through the rotor.

8. The apparatus of claim 7 wherein said inner rotor section defines a plurality of inner passage means extending from the maximum diameter end thereof toward the axis of said rotor, an annular passage about said shaft communicating with said rotor passage means and with said annular passage between said shaft and said ring, whereby displaced lighter phase liquid is free to flow through said inner rotor passages and along the outer surface of said rotor toward and into said last-mentioned annular passage.

9. The apparatus of claim 8 which further includes a coalescer mounted for rotation upon said rotor shaft within said casing comprising a series of long thin axial passages for the reception of effluent after leaving said vanes, a sealed casing, a plurality of axial, radially and tangentially slanted vanes in said casing mounted for rotation upon said shaft downwstream of said coalescer to receive said effluent therefrom, means to permit the flow into said shaft of the lighter phase liquid removed from said effluent by said coalescer and by said vanes and discharge outlet means for the remainder of said effluent.

10. The apparatus of claim 9 wherein means are provided to recover energy from the flow of said effluent prior to discharge of said effluent.

* * * * *